F. P. DAHLSTROM AND C. R. STURDEVANT.
BRAZING CAR.
APPLICATION FILED SEPT. 3, 1919.

1,334,691.

Patented Mar. 23, 1920.
5 SHEETS—SHEET 1.

INVENTOR
F. P. Dahlstrom
C. R. Sturdevant
BY
D. Anthony Usina
ATTORNEY

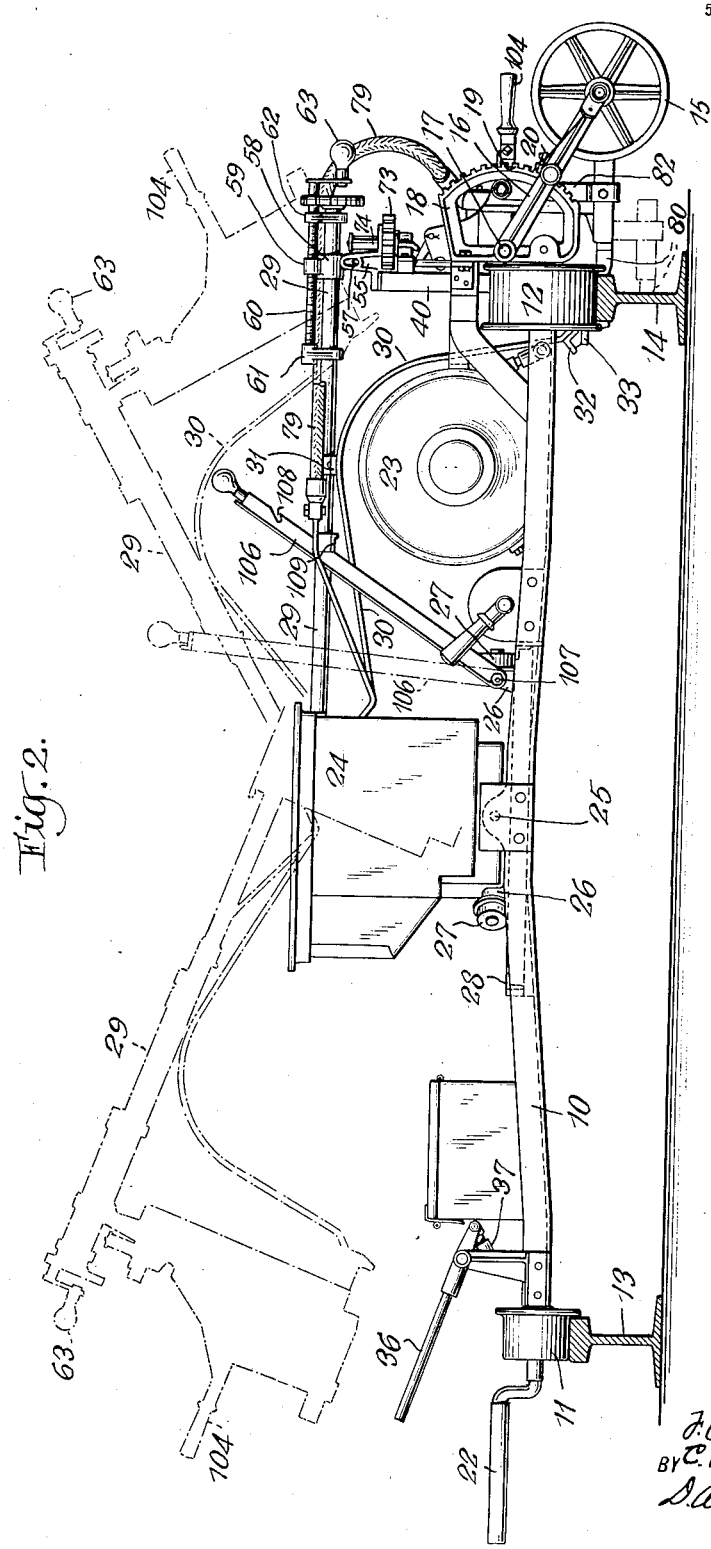

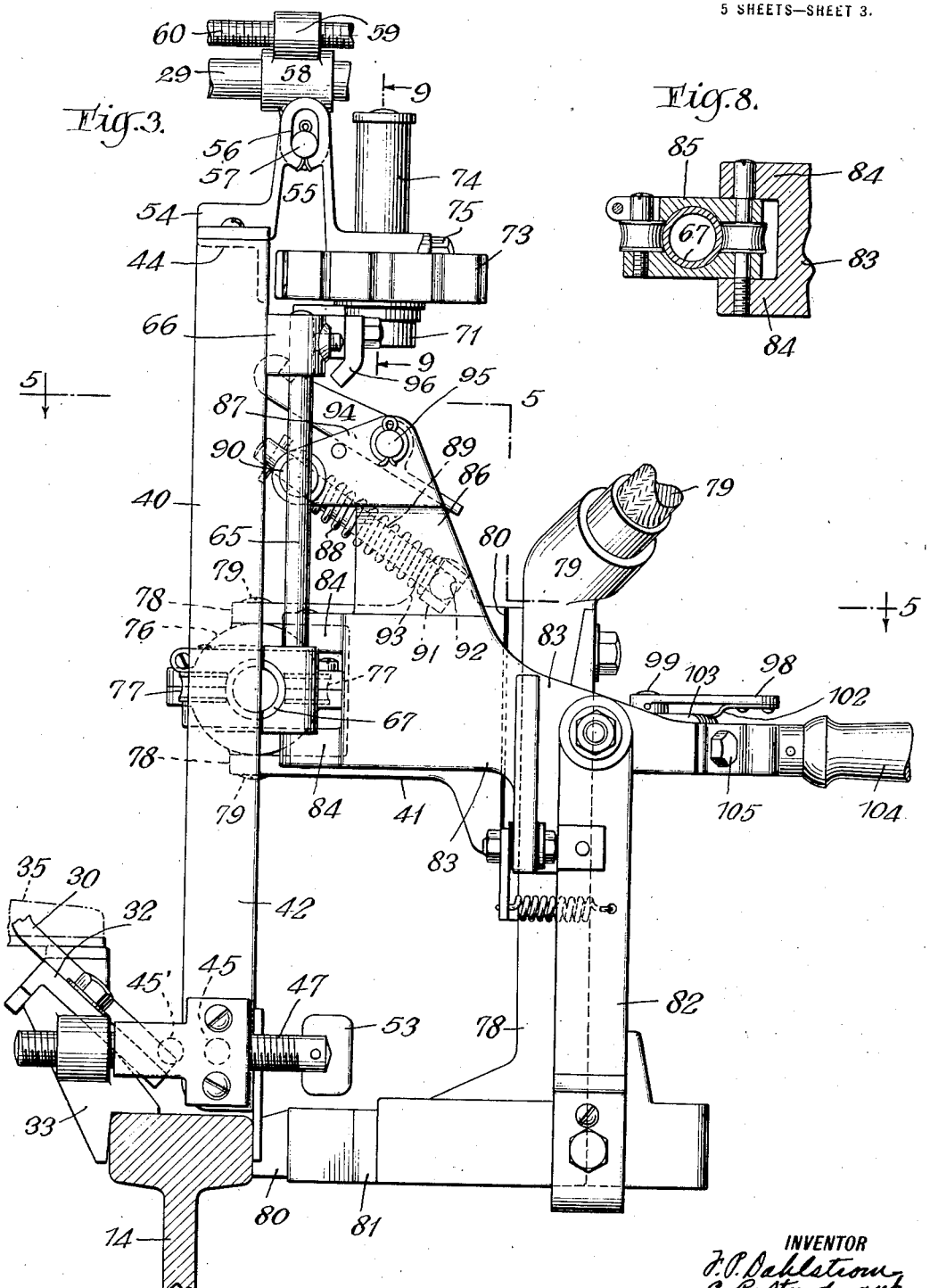

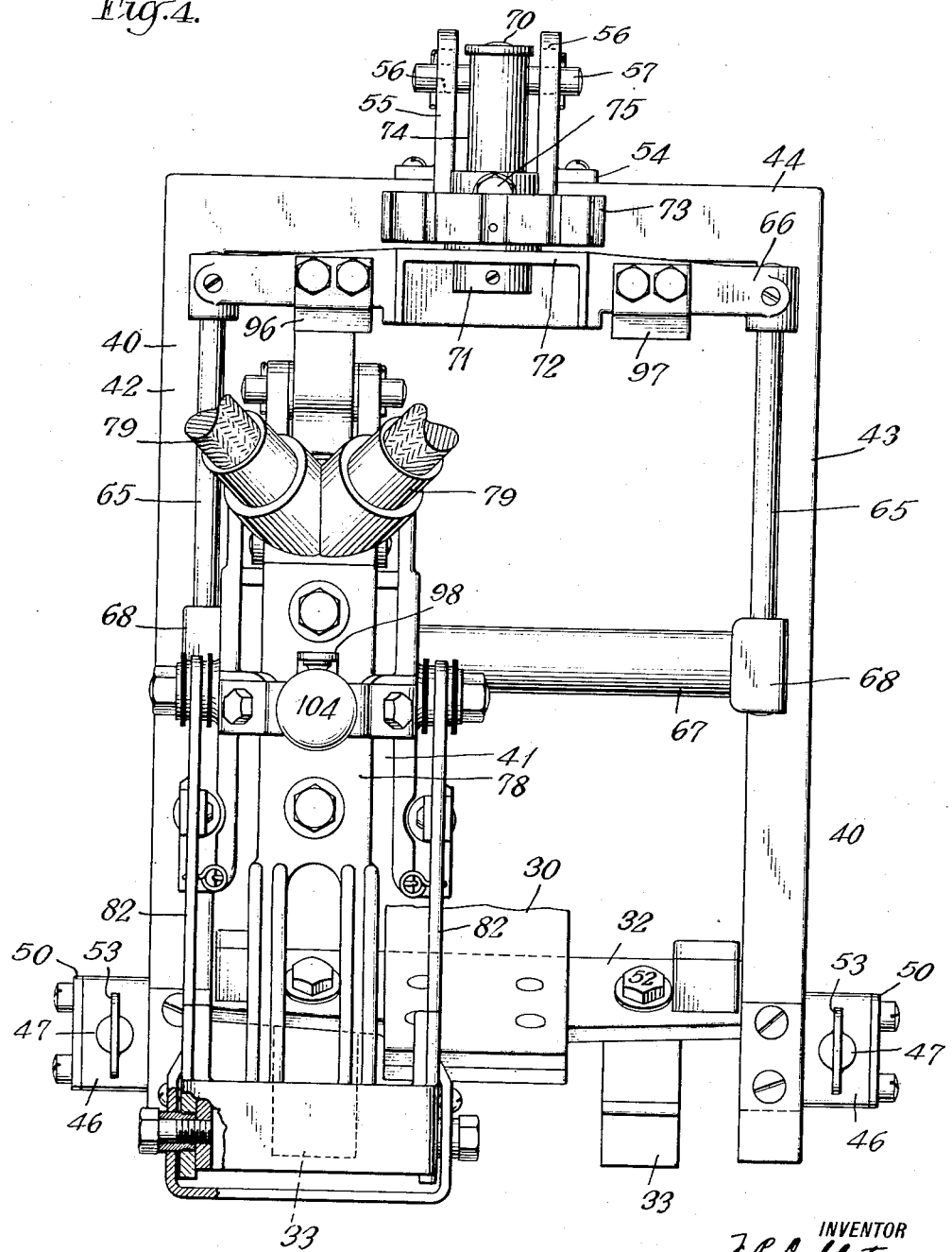

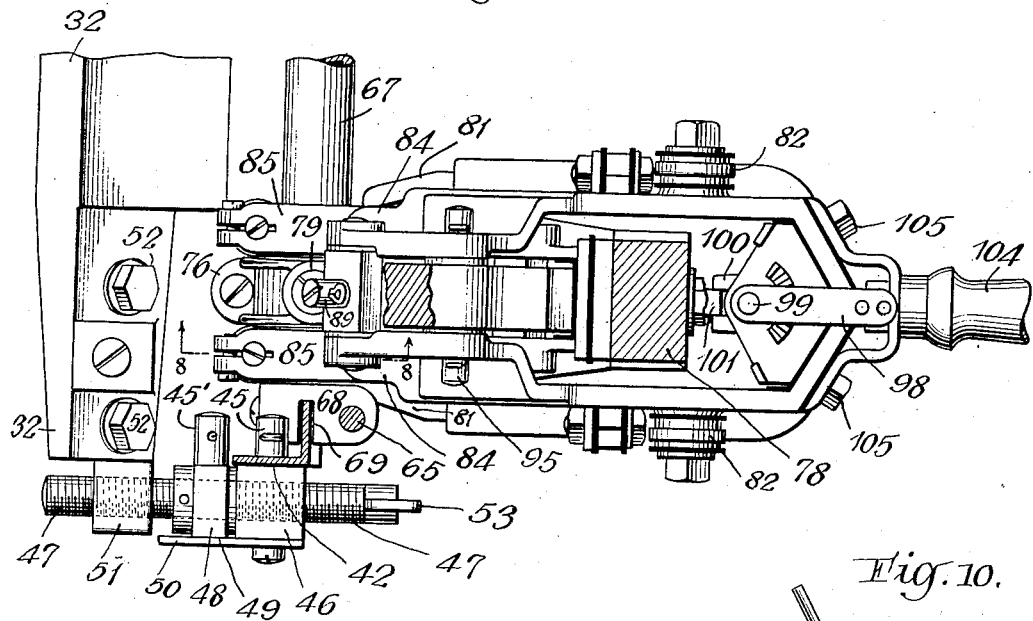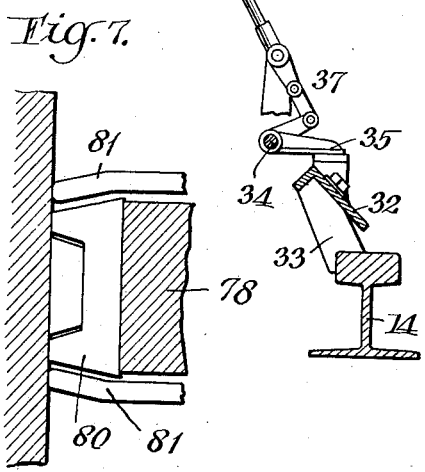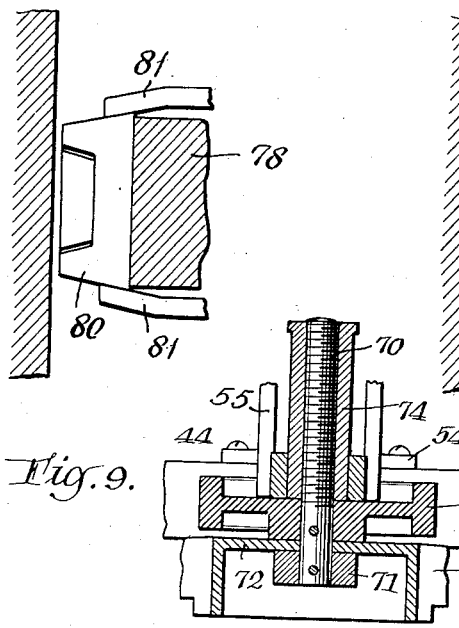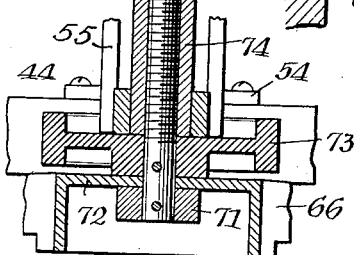

UNITED STATES PATENT OFFICE.

FRANK P. DAHLSTROM AND CHARLES R. STURDEVANT, OF WORCESTER, MASSACHUSETTS, ASSIGNORS TO THE AMERICAN STEEL AND WIRE COMPANY OF NEW JERSEY, A CORPORATION OF NEW JERSEY.

BRAZING-CAR.

1,334,691.  Specification of Letters Patent.  Patented Mar. 23, 1920.

Application filed September 3, 1919. Serial No. 321,353.

*To all whom it may concern:*

Be it known that we, FRANK P. DAHLSTROM and CHARLES R. STURDEVANT, citizens of the United States, and both residents of Worcester, Worcester county, Massachusetts, have invented certain new and useful Improvements in Brazing-Cars, of which the following is a specification.

Our invention relates to an improved car carrying the necessary equipment for applying rail bonds to either the ball or the web of either of the rails on which the car travels. The car is of light construction and can be easily moved along the railway tracks and supplemental wheels are provided whereby the whole car is rendered portable. Handles are secured to the skeleton frame so that the car may be moved from place to place much in the same fashion as a wheel-barrow is moved about.

Our improved brazing car is provided with a rotary converter for changing the 500 volt direct trolley current to an alternating current to about 350 volts. The car also carries a welding transformer which converts the 350 volt alternating current to a low voltage welding current ranging approximately from 3 to 6 volts.

The welding transformer is mounted on a turn-table located centrally of the car and the brazing head for applying the bonds is supported from this welding transformer. Means are provided for rocking the welding transformer on horizontal trunnions so that the brazing head can be swung up and down and a turn-table affords means whereby the transformer and brazing head can be brought into position to operate on either of the rails which the car traverses.

One of the objects of the invention is to provide a car of light construction for carrying all the necessary elements for electrically attaching bonds to rails. Another object is to so construct the car that it can be readily moved from place to place when not mounted on the track rails. A further object is to provide means for supporting the brazing head whereby it can be quickly swung into position to operate on either the ball or the flange of either of the rails of the track on which the car is mounted.

Another object is to provide improved adjustable supporting means for the brazing head whereby it may be roughly adjusted to position to operate on either the ball or the web of the rail and subsequently given a differential adjustment to accurately position the working face of the brazing electrode. A further object is to provide adjustable supporting means for the brazing electrode whereby it may be disposed at various angles to bring the working face thereof into proper contact with rails having side walls of different angles.

A further object is to provide means whereby the greater portion of the weight of the car may be concentrated on one set of the electrodes to secure a good contact between said electrodes and the rail. Another object is to combine the various elements herein shown and described so as to effectively perform the various functions set forth. Other objects will be apparent from the following description and appended claims when read in connection with the accompanying drawings in which like characters of reference refer to like parts in several views.

Fig. 2 is a side elevation thereof;

Fig. 3 is an enlarged detail in side elevation showing the brazing head and its supporting structure;

Fig. 4 is a front elevation of the parts shown in Fig. 3 as viewed from the right;

Fig. 5 is a horizontal section on the staggered line 5—5 of Fig. 3;

Figs. 6 and 7 are fragmentary details illustrating different positions of the carbon grips or contacts used in applying the bonds to the rail;

Fig. 8 is a detail vertical section on the line 8—8 of Fig. 5;

Fig. 9 is a detail section on the line 9—9 of Fig. 3;

Fig. 10 is a detail view showing means for concentrating the weight of the car on one set of electrodes.

Figure 1:
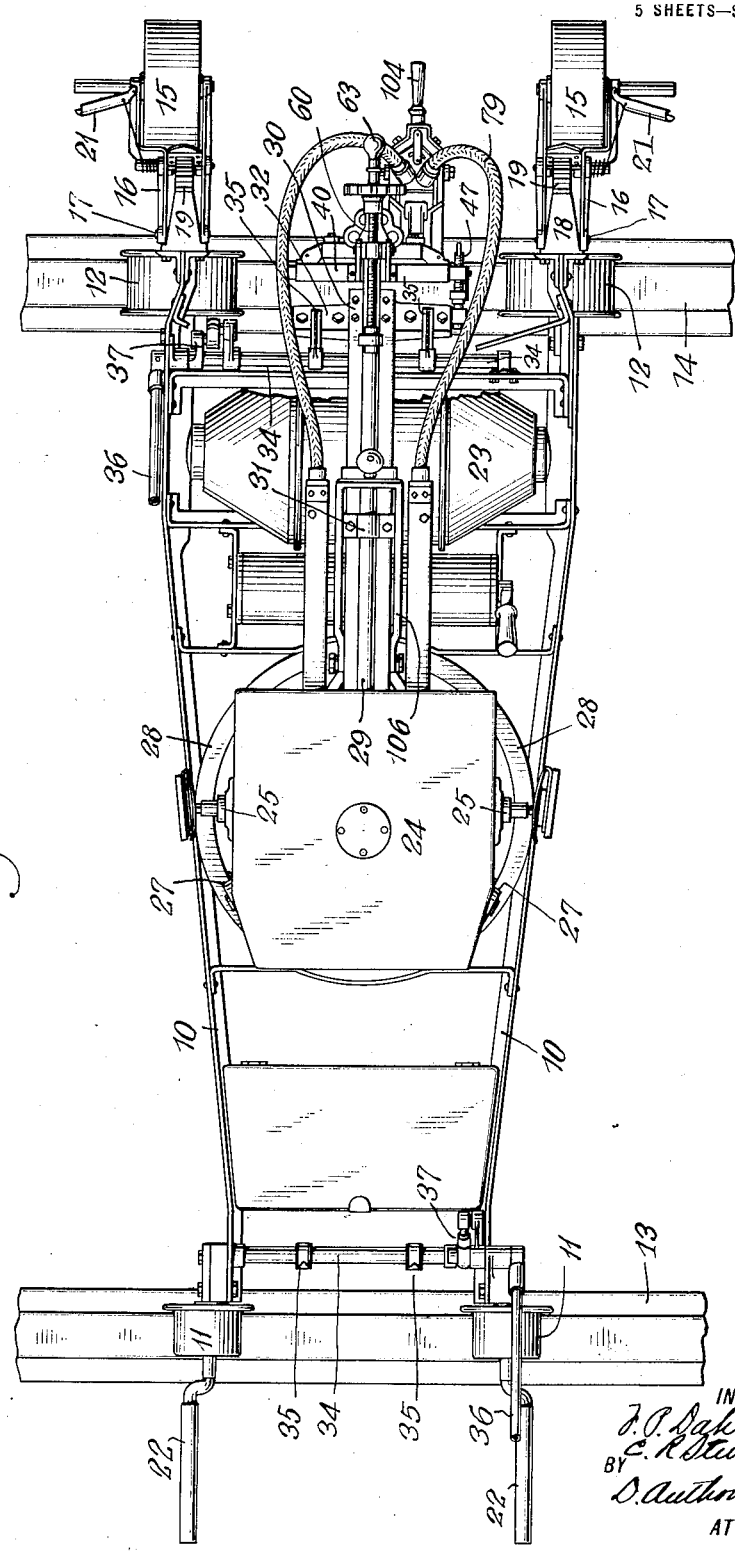
Figure 1 is a top plan showing the general arrangement of a brazing car provided with the necessary equipment for applying rail bonds.

Referring first to Figs. 1 and 2, our improved brazing car comprises a skeleton frame 10 which is supported on track wheels 11 and 12 located at each end thereof and adapted to travel on the rails 13 and 14 to which the bonds are to be applied. At one end of the car a pair of supplemental wheels 15 are mounted on swinging arms 16 which are pivoted at 17 to brackets 18 secured to the skeleton frame. These brackets are each provided with a toothed sector 19 arranged to coöperate with a latch 20 which is carried by the swinging arms 16 and adapted to be manipulated by handles 21 as shown. At the opposite end of the car hand grips 22 are provided to enable workmen to move the car from place to place.

It will be clear from the above that when it is desired to remove the brazing car from the tracks the arms 16 can be swung down until the wheels 15 carried thereby come into contact with the ground and the lock 20 manipulated to engage with the teeth of sector 19. The whole car may then be raised up grasping the grips 22 which will free the wheels 11 and 12 from the tracks and permit the car to be moved about in much the same manner as a wheel-barrow is moved.

A rotary converter 23 is secured to the skeleton frame of the car and is adapted to convert the direct current from the trolley line to an alternating current to be used for the brazing operation. This converter supplies current to a welding transformer 24 which in turn steps the current down to the proper welding voltage. In the equipment shown the converter changes the D. C. trolley current from 500 volts to an A. C. current of approximately 350 volts and the welding transformer converts this 350 volt current to a welding current of about 3 to 6 volts. The welding transformer is carried on trunnions 25 which turn in bearings on a frame 26 which frame is carried by flanged rollers 27 arranged to travel on the turntable 28 which is secured to the skeleton frame 10.

The brazing head and the other track terminals are both supported from the welding transformer and as this transformer is mounted for oscillation on the trunnions 25 and for rotation on the turn-table 28 it will be readily seen that the brazing head can be swung into position to operate on either of the track rails as indicated by the full and dotted lines in Fig. 2.

A supporting arm 29 extends outwardly from the welding transformer 24 for adjustably supporting the brazing head to be presently described. A conductor 30 extends outwardly from the transformer and is supported by a bracket 31 secured to the arm 29. At its outer end this conductor carries a bracket 32 to which is secured a pair of electrodes 33. The car is provided with a shaft 34 shown in Figs. 1 and 10, having arms 35 thereon which are arranged to be swung into contact with the bracket 32 to concentrate the weight of one end of the car on the bracket 32 to effect a good contact between the electrodes 33 and the ball of the rail being welded.

The shaft 34 is rocked by means of a handle 36 operating through suitable toggle mechanism indicated at 37 in Figs. 1 and 10. There is a shaft 34 at each end of the car as illustrated in Fig. 1, so that the weight of the car may be transferred to the bracket 32 for brazing bonds on either of the track rails.

A main supporting frame 40 (Figs. 3 and 4) serves to adjustably support the brazing head 41. This main frame consists of uprights 42 and 43 joined at the top by a cross-bar 44. At the lower end of each of the uprights 42 and 43 the main frame is pivoted on a stud 45 secured in a block 46 carried by adjusting screw 47. Also mounted on each adjusting screw 47 is a block 48 having a flat side 49 bearing against a guide plate 50 secured to the block 46, the screw 47 passing freely through the block 48 and being arranged to move said block longitudinally. (See Fig. 5).

Each block 48 (Fig. 5) carries a pin 45' on which the uprights 42 and 43 are pivoted when the web of the rail is to be bonded. The adjusting screw 47 is in threaded engagement with a bracket 51 secured by means of cap screws 52 to the underside of the bracket 32 carried by the conductor 30. This bracket being the one which carries the electrodes 33. The adjusting screw 47 is provided with a thumb piece 53 which may be manipulated to move the block 48 to different positions corresponding to different widths of rails. To the upper cross-bar 44 of the main frame is secured a bracket 54 having upright arms 55 provided with slots 56 through which project a pin 57 carried by a bracket 58 which is guided on the supporting arm 29 above referred to. This bracket 58 is formed with an internally screw threaded lug 59 for engagement with a feed screw 60 supported in brackets 61 and 62 secured to the supporting arm 29 and provided with an operating handle 63. A turning movement of the handle 63 will clearly feed the bracket 58 along the arm 29 and thereby swing the main frame 40 about its pivots 45 either toward or away from the transformer. This movement will permit the brazing head to be brought into position for operating on rails having side walls of different angular inclinations and will also permit the said brazing head to be properly positioned laterally to operate on either the ball or the flange of the rail. When operating on the ball of the rail the parts are approximately in vertical position as shown in Figs. 2 and 3. When operating on the flange of the rail the main frame will be pivoted on the studs 45' and the handle 63 will be turned to move the main frame 40 toward the welding transformer 24. A supplemental frame 64 comprising uprights 65, top cross-bar 66 and a bottom cross rod 67 is guided by the uprights 42 and 43 of the main frame 40. The corner brackets 68 of the supplemental frame have grooves 69 formed therein adapted to engage flanges of the uprights 42 and 43 of the main frame as shown clearly in Fig. 5. The supplemental frame is held in position by a screw threaded rod 70, Fig. 9, having a collar 71 secured to its lower end which impinges on the lower side of a flange 72 secured to the top crossbar 66 of the supplemental frame. A hand wheel 73 is fixed on the screw 70 which is threaded through a bushing 74 which is adjustably secured to the main frame by means of a bolt 75 Fig. 4. The bushing 74 is held in the position shown in Figs. 4 and 9 when bonding the ball of the rail. In this position accurate vertical adjustment of the supplemental frame is obtained by manipulating the hand wheel 73.

When it is desired to operate on the flange of the rail the bolt 75 is loosened thereby permitting the bushing 74 to drop and roughly adjust the supplemental frame in position for operating at the lower level, further accurate adjustment being obtained by manipulating the hand wheel 73.

The brazing head 41 is mounted on a crossbar 67 of the supplemental frame and therefore moves with it. This head is supported by a carriage 76 provided with anti-friction rollers 77 and adapted to be moved longitudinally along the rod 67 and also swung about the axis thereof. Arms 78 of the brazing head are pivoted at 79 to the carriage 76 above described. And on the outer end of said brazing head the brazing electrode 78 and the feed terminals 79 are secured, suitable insulation 80 being interposed between the electrode and the brazing head as shown clearly in Fig. 3. The working face of the electrode herein shown comprises a removable carbon mold 80 which is adapted to engage terminals of the rail bond to be brazed to the rail. This carbon mold is held in place when in inoperative position by a clamp 81 carried by arms 82 depending from a yoke 83 which straddles the brazing head 41.

At the time when the current is turned on for brazing the bond to the rail the yoke 83 is rocked about the rod 67 thereby swinging the clamp 81 inward in which position its inner end clears the side walls of the carbon mold as illustrated in Fig. 7, the pressure exerted by spring 88, hereinafter referred to, on the electrode 78 firmly holds the mold in position at this time.

The yoke 83 is provided with arms 84 firmly secured to a slidable carriage 85 similar to the carriage 76 above referred to; and a pair of upwardly extending arms 86 having rearwardly extending ears 87 formed thereon. A compression spring 88 is carried by a rod 89, one end of which passes through a stud 90 journaled in the ears 87 and the other end of said rod being secured in a block 91 pivoted at 92 to a pair of ears 93 formed in the brazing head. This spring 88 serves to yieldingly connect the brazing head with the yoke 83. A latch 94 pivoted at 95 to the yoke 86 is adapted to engage either one or the other detents 96 or 97, Figs. 3 and 4, when the electrode 78 is in welding engagement with the rail.

The brazing head 41 may be swung about the vertical axis 79 in order to accurately aline the working face of the electrode 78 or the carbon mold with the side wall of the rail. This adjustment is effected by manipulating a small lever 98, Figs. 3 and 5, which rocks a short shaft 99 having a fork 100 secured thereto and arranged to engage a projection 101 formed on the electrode. A spring 102 is secured to the underside of the adjusting lever 98 and coöperates with a ratchet 103 to hold the parts in their adjusted positions.

The yoke 83 has an operating handle 104 secured by bolts 105, by means of which the brazing head as a whole may be swung about the axis of the rod 67 into or out of operative position.

In operation to install a bond the rail surface is first cleaned and the car is positioned over the joint to be bonded then the brazing head is moved from the dotted to the full line position shown for example at the right in Fig. 2, assuming that the bond is to be applied to the ball of the rail. The lever 36 is then operated to bring the arms 35 carried by the shaft 34 into engagement with the bracket 32 thereby raising one end of the car a short distance concentrating the greater part of the weight of the car on the terminals 33 and effecting a good contact with the rail. The operator then manipulates the hand wheel 73 to raise or lower the working face of the electrode to bring it into position to apply the bond at the desired elevation. The lever 98 may then be adjusted if necessary to accurately aline the working face of the electrode with the side wall of the rail, it being clear that if the wall of the rail is inclined an adjustment may be made by turning the handle 63 to slightly incline the main frame and thereby accurately position the working face of the electrode so as to secure a flat even contact with the side wall of the rail. After these adjustments have been made the operator will slightly depress the handle 104 thereby rocking the yoke 83 about the cross-bar 67 and compressing the spring 88. The latch 94 will then be operated to engage the detent 96 and hold the brazing head and welding electrode including the carbon mold in working position with a spring pressure. After the brazing operation has been completed the dog 94 will be disengaged from the stop 96 and the brazing head will be moved along the rod 67 to position the electrode for brazing the other terminal of the rail bond, whereupon the handle 104 will be again depressed and the latch 94 engaged with the other detent 97 to hold the parts in position during the brazing operation.

When the current is turned on its path is from the transformer by cables 79 to the copper electrode 78, and carbon mold 80, then the rail bond and the rail to the contacts 33, returning to the other side of the transformer by way of the bracket 32 and the conductor 30. The electrode 78, conductors 79, and arms 82 for holding the carbon mold clamp, and the operating handle are all insulated from the other parts of the structure as clearly shown in the drawings.

After the bond has been properly secured in place the brazing head may be swung upward about the axis of the rod 67 so as to clear the bond and then the whole brazing apparatus may be rocked about the trunnion 25 on the transformer 24 thereby swinging the parts up to the dotted position shown in Fig. 2. The brazing unit is held in this position by means of a lever 106 pivoted at 107 to the frame 26 which supports the transformer, the lever 106 being provided with a notch 108 adapted to engage a cross-bar 109 secured to the supporting arm 29.

Though we have described with great particularity in detail the specific embodiment of the invention, it is not to be understood therefrom that we are limited thereto, as changes may be made without departure from the invention as defined in the appended claims.

What we claim is:

1. A brazing car comprising a skeleton frame supported on track wheels arranged to traverse the rails which are to be bonded, a brazing head adjustably supported on said frame and adapted to be swung into position to apply bonds to either of the rails which said car traverses and wheels carried by said skeleton frame the axes of which are substantially at right angles to said track wheels forming a portable support for said car when it is removed from the track rails.

2. A brazing car comprising a skeleton frame supported on track wheels arranged to traverse the rails which are to be bonded, a brazing head adjustably supported on said frame and adapted to be swung into position to apply bonds to either of the rails which said car traverses and wheels carried on adjustable brackets secured to said skeleton frame and arranged to be swung into contact with the ground and support the car when it is to be removed from the track rails.

3. A brazing car comprising a skeleton frame supported on track wheels arranged to traverse the rails which are to be bonded, a brazing head adjustably supported on said frame and adapted to be swung into position to apply bonds to either of the rails which said car traverses and wheels carried on adjustable brackets secured to said skeleton frame and arranged to be swung into contact with the ground and support the car when it is to be removed from the track rails and locking means co-acting with said adjustable arms for varying the elevation of said wheels.

4. In an apparatus of the class described, a welding transformer, a main supporting frame carried thereby, a supplemental frame guided by and adjustably supported on said main supporting frame, means secured to the transformer for sustaining the main frame, means for effecting a horizontal adjustment of said main frame, means carried by the main frame for vertically adjusting the supplemental frame and a brazing head having an electrode secured thereto carried by said supplemental frame.

5. In an apparatus of the class described, a welding transformer, a main supporting frame carried thereby, a supplemental frame guided by and adjustably supported on said main supporting frame, means secured to the transformer for sustaining the main frame, means for effecting a horizontal adjustment of said main frame, means carried by the main frame for vertically adjusting the supplemental frame and a brazing head having an electrode secured thereto mounted for oscillation about and longitudinal movement along a horizontal cross-bar carried by the supplemental frame, a yoke carried by said cross-bar having an operating handle secured thereto, said yoke being connected by a yielding member to the brazing head, and means secured to said yoke and coöperating with a detent secured to the first mentioned frame for holding said electrode with a yielding pressure in contact with the rail which is to be welded.

6. A welding transformer, a supporting arm carried thereby, a main frame supported by said arm and said welding transformer, means carried by said supporting arm for adjusting said main frame toward and away from the rail, a supplemental frame slidably mounted on the main frame and means carried by the main frame for effecting a relative vertical adjustment between said main frame and said supplemental frame, a brazing head including an electrode mounted for horizontal adjustment on said supplemental frame and yielding means for holding said electrode in working position.

7. A brazing car arranged to traverse the rails which are to be bonded, a welding transformer carried for adjustment on trunnions mounted on a turntable on said car, a brazing head carried by said transformer and arranged to be adjusted vertically and horizontally for applying bonds at different locations on either the ball or the web of the rail.

8. A brazing car arranged to traverse the rails which are to be bonded, a welding transformer mounted on a turntable on said car, a supporting arm carried by said transformer, a main frame supported by said arm and said transformer, means carried by said supporting arm for adjusting said main frame toward and away from the rail to be bonded, a supplemental frame guided on said main frame, means carried by the main frame for raising and lowering said supplemental frame, and a brazing head including an electrode slidably mounted on a horizontal cross bar secured to said supplemental frame.

9. A brazing car arranged to traverse the rails which are to be bonded, a welding transformer carried by said car, electrodes connected to said transformer, means whereby the weight of one end of the car can be concentrated on said electrodes to effect a good contact with the rail being welded.

10. A brazing car arranged to traverse the rails which are to be bonded, a welding transformer carried by said car, a supporting arm carried by said transformer, a brazing head adjustably supported by said arm and having an electrode secured thereto, a second electrode connected to said transformer and means whereby the weight of one end of the car can be concentrated on said electrode to effect a good contact with the rail being bonded.

11. A brazing car arranged to traverse the rails which are to be bonded, a welding transformer carried by said car, electrodes connected to said transformer, one of said electrodes being carried by an adjustable brazing head supported by said transformer and arranged to be held by spring pressure against the rail being bonded, and the other electrode being supported by a conductor carried by the transformer and means for concentrating part of the weight of the car on said last mentioned electrode to effect a good contact with the rail being bonded.

12. In an apparatus of the class described, an adjustable supporting structure, a brazing head carried thereby, an electrode carried by said brazing head, a carbon mold and yieldable means for holding said carbon mold in contact with said electrode when in its working position.

13. In an apparatus of the class described, an adjustable supporting structure, a brazing head carried thereby, an electrode carried by said brazing head, a carbon mold and a clamp arranged to hold said mold when the electrode is in its inoperative position and to be disengaged therefrom when the electrode is moved into working position.

14. In an apparatus of the class described, an adjustable supporting structure, a brazing head carried thereby, an electrode carried by said brazing head, a carbon mold, supporting means for said mold carried by said brazing head and yielding means for exerting a pressure on said carbon mold when in working position.

15. In an apparatus of the class described, an adjustable supporting structure, a brazing head carried thereby, an electrode carried by said brazing head, an operating yoke carried by said supporting structure, a yielding member connecting said brazing head and said yoke, and a latch carried by said yoke arranged to hold it in engagement with the supporting structure while the brazing head is held in working position by the pressure of said yielding member.

16. A brazing car arranged to traverse the rails to be bonded, a welding transformer mounted on said car for rotation about a vertical axis substantially midway between the rails to be bonded, supporting means mounted on said transformer arranged to have horizontal and vertical adjustment with relation thereto, and a brazing head carried by said supporting means and adapted to apply bonds to either of the rails traversed by said car.

17. A brazing car arranged to traverse the rails which are to be bonded, a welding transformer mounted on said car for rotation about a vertical axis substantially midway between the rails to be bonded, supporting means mounted on said transformer arranged to have horizontal and vertical adjustment with relation thereto, and a brazing head carried by said supporting means and adapted to apply bonds to either the ball or the flange of either of the rails traversed by said car.

18. In apparatus of the class described, a welding transformer, a supporting frame mounted on said transformer, a brazing head carried thereby, and means whereby said supporting frame and said head are adjusted both vertically and horizontally to thereby permit the application of bonds to either the ball or web of the rail and at different locations along the length of the rail.

19. In apparatus of the class described, a welding transformer, a brazing head, an electrode carried thereby, a main supporting frame and a supplemental frame carried thereby, said supplemental frame having a vertical adjustment relative thereto, said frames supporting said brazing head to permit vertical and horizontal movement thereof, and means for adjusting said electrode relatively to said supporting means about a substantially vertical axis when in operative position, to thereby bring the working face of said electrode into alinement with the side of the rail.

20. In apparatus of the class described, a transformer, a horizontal, main supporting frame mounted on said transformer, a supplemental frame mounted on said main frame, a brazing head carried by said supplemental frame, and an electrode carried by said brazing head, said main and supplemental frames being adjustable vertically and horizontally to thereby position the working face of said electrode at different locations on the side of the rail.

In witness whereof we have signed our names.

FRANK P. DAHLSTROM.
CHARLES R. STURDEVANT.